United States Patent
Dutta et al.

(10) Patent No.: US 12,120,389 B2
(45) Date of Patent: *Oct. 15, 2024

(54) SYSTEMS AND METHODS FOR RECOMMENDING CONTENT ITEMS BASED ON AN IDENTIFIED POSTURE

(71) Applicant: Rovi Guides, Inc., San Jose, CA (US)

(72) Inventors: Rupayan Dutta, West Bengal (IN); Vikram Makam Gupta, Karnataka (IN); Vishwas Sharadanagar Panchaksharaiah, Karnataka (IN); Sukanya Agarwal, Haryana (IN); Reda Harb, Tampa, FL (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,608

(22) Filed: Oct. 25, 2023

(65) Prior Publication Data

US 2024/0073482 A1 Feb. 29, 2024

Related U.S. Application Data

(63) Continuation of application No. 17/752,311, filed on May 24, 2022, now Pat. No. 11,843,829.

(51) Int. Cl.
*H04N 21/442* (2011.01)
*H04N 21/466* (2011.01)

(52) U.S. Cl.
CPC ... *H04N 21/44218* (2013.01); *H04N 21/4668* (2013.01)

(58) Field of Classification Search
CPC ......... H04N 21/44218; H04N 21/4668; H04N 21/4532; H04N 21/4826; H04N 21/4756;
(Continued)

(56) References Cited

U.S. PATENT DOCUMENTS

| 9,344,773 B2 | 5/2016 | Hayton et al. |
| 9,672,370 B1 | 6/2017 | Lewis et al. |

(Continued)

FOREIGN PATENT DOCUMENTS

| CN | 111090769 A | 5/2020 |
| CN | 114694200 A | 7/2022 |
| JP | 2008124555 A | 5/2008 |

OTHER PUBLICATIONS

Melzer et al., "How Do We Recognize Emotion From Movement? Specific Motor Components Contribute to the Recognition of Each Emotion", Frontiers in Psychology, vol. 10 (Jul. 2019), Article 1389 (doi: 10.3389/fpsyg.2019.01389).

(Continued)

*Primary Examiner* — Cynthia M Fogg

(74) *Attorney, Agent, or Firm* — Haley Guiliano LLP

(57) ABSTRACT

Systems and methods are provided for generating a content item recommendation based on an identified posture. An input associated with a content item delivery service is received at a computing device. A capture of a user is received, and a digital representation of the user is generated based on the capture of the user. A posture of the user is determined based on the digital representation of the user, and a content item genre is identified based on the determined posture. A content item recommendation that is based on the identified genre is generated and output.

20 Claims, 13 Drawing Sheets

(58) Field of Classification Search
CPC ....... H04N 21/44222; H04N 21/25891; H04N 21/251; H04N 21/466
USPC .......................................... 725/10
See application file for complete search history.

(56) References Cited

U.S. PATENT DOCUMENTS

| | | |
|---|---|---|
| 11,843,829 B1 | 12/2023 | Dutta et al. |
| 2012/0124604 A1 | 5/2012 | Small et al. |
| 2013/0243270 A1 | 9/2013 | Ferens et al. |
| 2014/0026156 A1 | 1/2014 | Deephanphongs |
| 2015/0128158 A1 | 5/2015 | Wheatley |
| 2015/0339301 A1* | 11/2015 | Paalborg ............... G06F 16/44 715/716 |
| 2016/0182955 A1 | 6/2016 | Klappert et al. |
| 2016/0379047 A1 | 12/2016 | Natan et al. |
| 2018/0205990 A1 | 7/2018 | Matthews et al. |
| 2018/0213284 A1 | 7/2018 | Shekhar et al. |
| 2020/0021886 A1 | 1/2020 | Kawk et al. |
| 2020/0228859 A1 | 7/2020 | Ho et al. |
| 2021/0026857 A1* | 1/2021 | Rigby ..................... G06F 3/012 |
| 2021/0029391 A1 | 1/2021 | Choudhari et al. |
| 2023/0412877 A1 | 12/2023 | Dutta et al. |

OTHER PUBLICATIONS

Sapiński et al., "Emotion Recognition from Skeletal Movements", Entropy, vol. 21, Issue 7 (Jul. 2019), Article 646 (doi: 10.3390/e21070646).

* cited by examiner

| Posture | Genre |
|---|---|
| Standing | Action |
| Sitting Upright | Crime |
| Sitting Lean | Drama |
| Lying Down | Comedy |

FIG. 11

SYSTEMS AND METHODS FOR RECOMMENDING CONTENT ITEMS BASED ON AN IDENTIFIED POSTURE

CROSS-REFERENCE TO RELATED APPLICATION

This application is a continuation of U.S. patent application Ser. No. 17/752,311, filed May 24, 2022, the disclosures of which are hereby incorporated by reference herein in their entireties.

BACKGROUND

The present disclosure is directed towards systems and methods for generating a content item recommendation. In particular, systems and methods are provided herein that generate a content item recommendation based on an identified posture.

SUMMARY

The proliferation of content item delivery services, including over-the-top (OTT), streaming and video on demand (VOD) services, such as Netflix, Amazon Prime Video, Disney+ and Hulu, affords users of content items more choice than ever before. However, when a user first accesses a content item delivery service, they may not have a clear idea of what they want to view. This issue may be particularly apparent when a user accesses a content item delivery service for the first time, as the user may not be aware of all the content items that are available. In addition, the content item delivery service may have a wide breadth of content items available, which may make it more difficult for the user to find something suitable to consume. This may lead a user to access one content item after another, looking for something to consume. For example, a user may access the first episode of many different series. As the user of the content item delivery service may ultimately discard and/or skip content that they are not interested in consuming, network bandwidth, storage resources and/or processing resources will be wasted during the delivery of additional content that is not relevant. In order to reduce the consumption of these resources, many content item delivery services may recommend content items to a user. In order to make recommendations more pertinent to the user, typically these recommendations may be based on, or generated from, previously consumed content items. However, when a user is accessing a content item delivery service for the first time, there is no consumption history on which to base recommendations. As such, resources may be wasted when a new user is looking for content to consume on a content item delivery service. In addition, at times, a user may prefer, for example, romance content items, and at other times, the user may prefer action content items. As such, simply basing recommendations on previously consumed content items may not give rise to optimal recommendations, and resources may be wasted while a user searches for a particular genre of content item to watch.

To overcome these problems, systems and methods are provided herein for generating a content item recommendation. In particular, systems and methods are provided herein that generate a content item recommendation based on an identified posture.

Systems and methods are described herein for generating a content item recommendation. In accordance with some aspects of the disclosure, a method is provided for generating a content item recommendation based on an identified posture. An input associated with a content item delivery service is received at a computing device, and a capture of a user is received. A digital representation of the user is generated based on the capture of the user, and a posture of the user is determined based on the digital representation of the user. A content item genre is identified based on the determined posture of the user, and a content item recommendation is generated based on the identified genre. The content item recommendation is output.

In an example system, a user opens an OTT application, such as a Netflix application, on a smart television, via a command issued from a remote control. On receiving the command, software running on the smart television opens the OTT application. On opening the OTT application, a camera integrated into the smart television takes a photo of the user. A posture of the user is determined, based on the photo of the user. This may comprise, for example, locating skeletal joints of the user in order to determine a posture of the user. In some examples, the posture of the user is determined locally, at the smart television. In some examples, the user posture may be determined via a trained algorithm. The smart television may comprise, for example, an artificial intelligence accelerator chip, such as a Google Tensor chip, or a Samsung Exynos chip, which may be used in determining the posture of the user. In other examples, the capture of the user is transmitted via a network, such as the internet, to a server. Software running at the server may determine a posture of the user, and an indication of the posture may be transmitted back to the smart television and/or to a program running on another server (or the same server). Based on the identified posture, a genre is identified. For example, if the user posture is determined to be a "lying down" posture, this may be associated with the "comedy" genre. In some examples, postures may be mapped to genres via an updatable lookup table. Following the identification of the genre, a content item recommendation may be generated. For example, a recommendation for the comedy film "Meet the Parents" may be generated. The OTT application then displays the generated recommendation to the user, via a display of the smart television. In some examples, the user can select the recommendation, or a user interface element associated with the recommendation, to play the recommended content item.

An emotion of the user may be determined and the content item genre may be further determined based on the determined emotion. A time period associated with the identified posture may be determined, and it may be identified whether the time period exceeds a threshold time period. If the time period exceeds the threshold time period, an updated content item genre may be identified based on the determined posture of the user and the time period. An updated content item recommendation may be generated, based on the updated content item genre, and the updated content item recommendation may be output. An orientation of the computing device may be identified, and determining the posture of the user may further comprise determining a posture based on the identified orientation of the computing device. The input may be spoken input, a user profile may be identified based on the spoken input, and the determined posture may be associated with the user profile.

Identifying a content item genre may further comprise determining a genre via a posture-to-genre mapping table. An interaction level associated with a content item recommendation may be identified, and it may be determined whether the interaction level is below a threshold value. If the interaction level is below the threshold value, then the posture-to-genre mapping table may be updated to associate a different posture with the genre on which the content item recommendation has been generated.

The capture may be of a plurality of users, and generating the digital representation of the user may further comprise generating a digital representation of at least a subset of the plurality of users. At least a subset of the users may be identified in the digital representation, and a probability value associated with each user of the plurality of users may be generated, where the probability value may indicate a probability of each user interacting with the service. The posture may be identified for the user having the highest probability value associated with them. The at least a subset of users in the digital representation may be identified via silhouette-based feature extraction.

A segment of a content item and an associated manifest file may be received at the computing device. An indication to determine the posture of the user at a playback time of the content item may be identified via the manifest file. Determining the posture of the user may further comprise determining the posture of the user at the indicated playback time.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 11 shows an example data table mapping posture to genre, in accordance with some embodiments of the disclosure;

Figure 12:
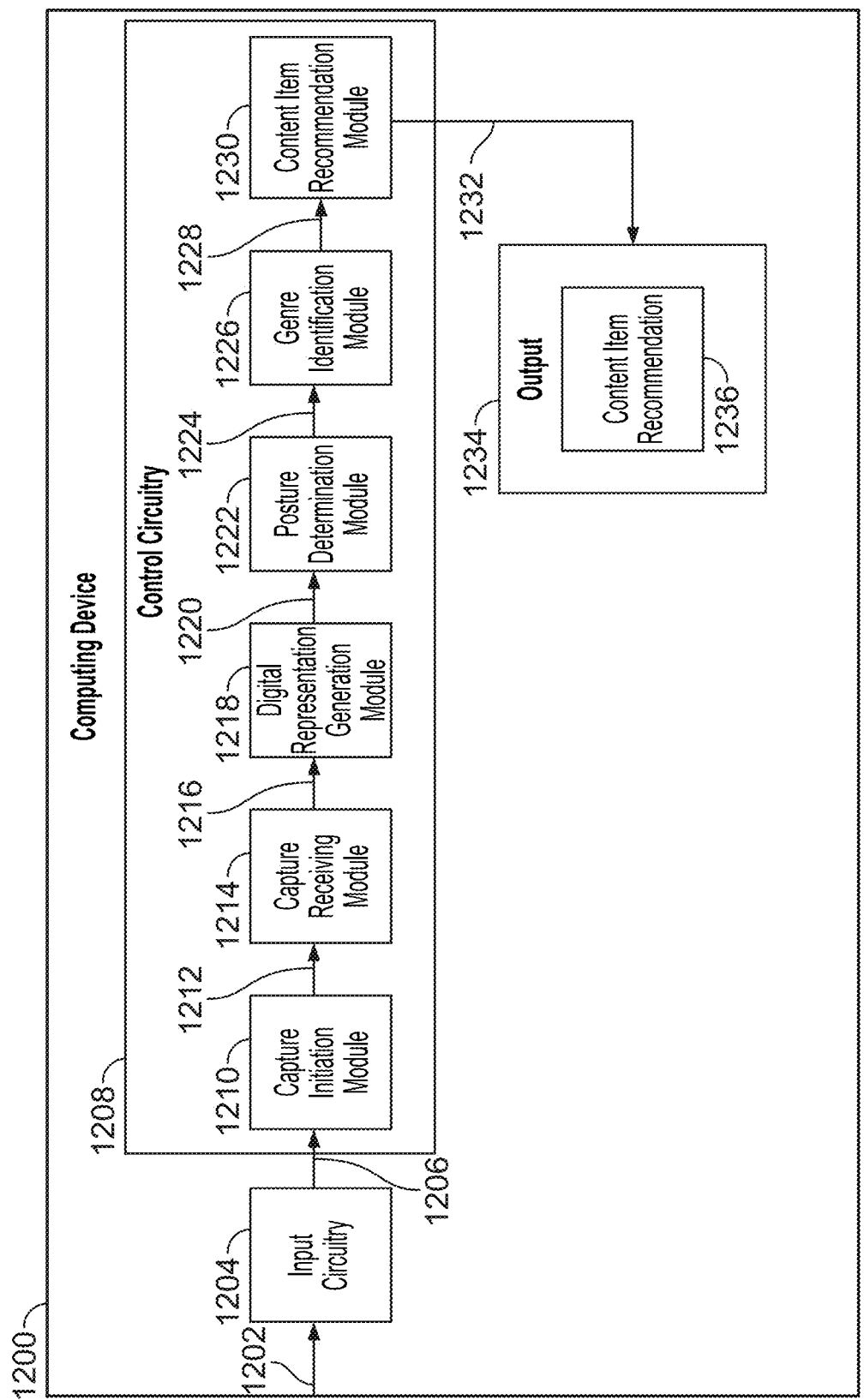
Figure 13:
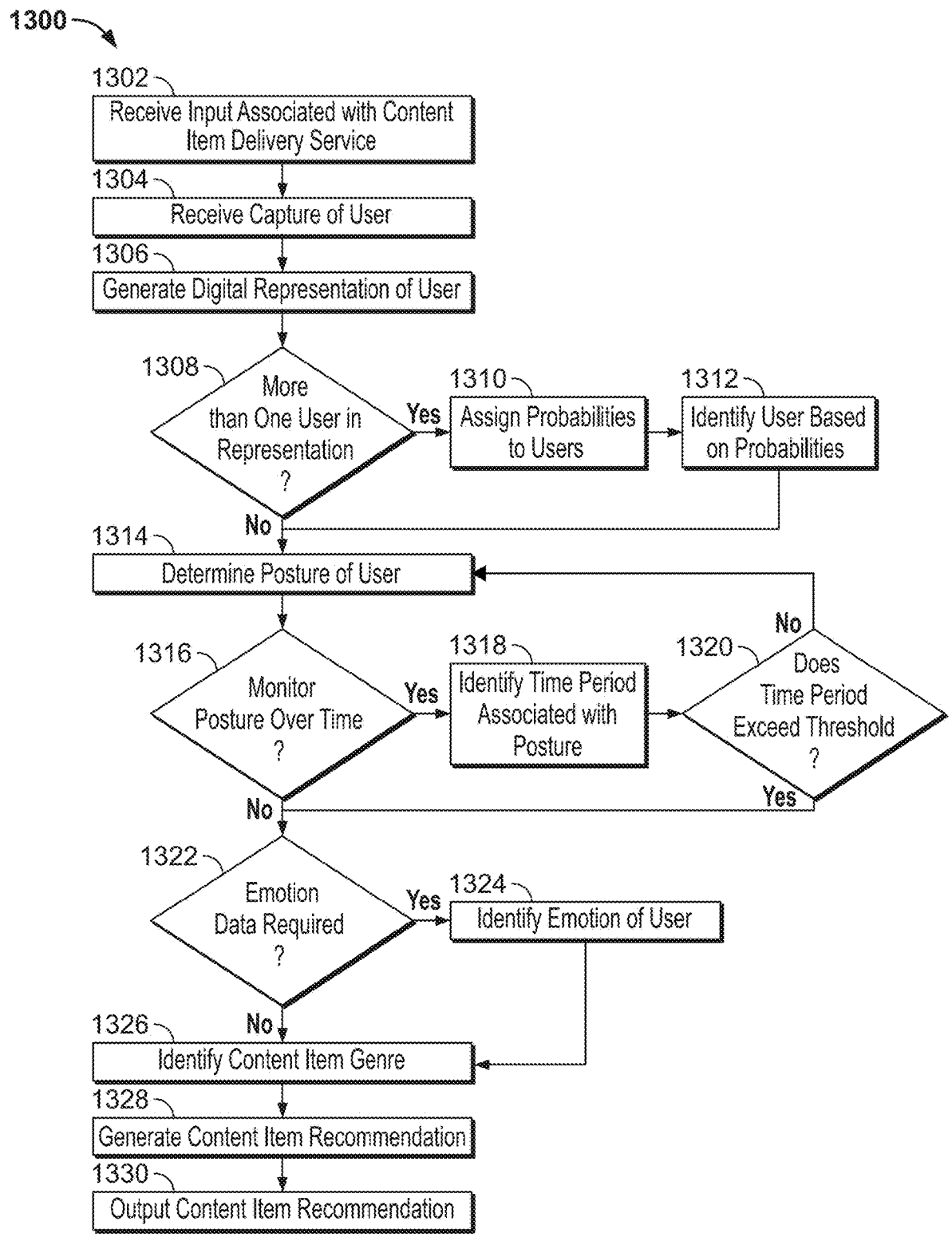

FIG. 12 shows a block diagram representing components of a computing device and data flow therebetween for generating a content item recommendation based on an identified posture, in accordance with some embodiments of the disclosure; and FIG. 13 shows a flowchart of illustrative steps involved in generating a content item recommendation based on an identified posture, in accordance with some embodiments of the disclosure.

DETAILED DESCRIPTION

Systems and methods are described herein for generating a content item recommendation. A content item includes audio, video, text and/or any other media content. Audio includes audio-only content, such as podcasts. Video includes audiovisual content such as movies and/or television programs. Text includes text-only content, such as event descriptions. A media content item may comprise a number of segments. These portions may be identified in an associated manifest file. The media content item may be of any suitable known format. One example of a suitable media content item is one that complies with the MPEG DASH standard. An OTT, streaming and/or VOD service (or platform) may be accessed via a website and/or an app running on a computing device and may receive any type of content item, including live content items and/or on-demand content items. Content items may, for example, be streamed to physical computing devices. In another example, content items may, for example, be streamed to virtual computing devices in, for example, a virtual environment and/or the metaverse.

"Capture" is a broad term that includes, for example, an image taken by a camera, images taken by a stereo camera, frames taken by a video camera, point data generated by a LiDAR device, output from a Microsoft Kinect sensor, output from an ultrasonic sensor, and/or output from a laser sensor. A digital representation of a user may be any digital representation, including, for example, a raw image file, a compressed image file, any unprocessed, or processed, data from a sensor, and/or a set of coordinates generated from the capture, wherein the coordinates may represent user joints.

"Posture" is a broad term that is used to indicate the position of the body of a user. For example, postures include sitting, standing, lying down, and sitting upright. A determined posture may have a confidence level associated with it. In some examples, more than one posture may be associated with a user, for example, 10% sitting, 82% lying down, indicating that at a given time it is more likely that the user is lying down than sitting. In some examples, the determined posture may be mapped to a preset group of postures. For example, a system may be configured to only identify whether a user is standing or sitting, and, for example, if the user is lying down, the user may be identified as sitting, as lying down is closer to sitting than it is to standing.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
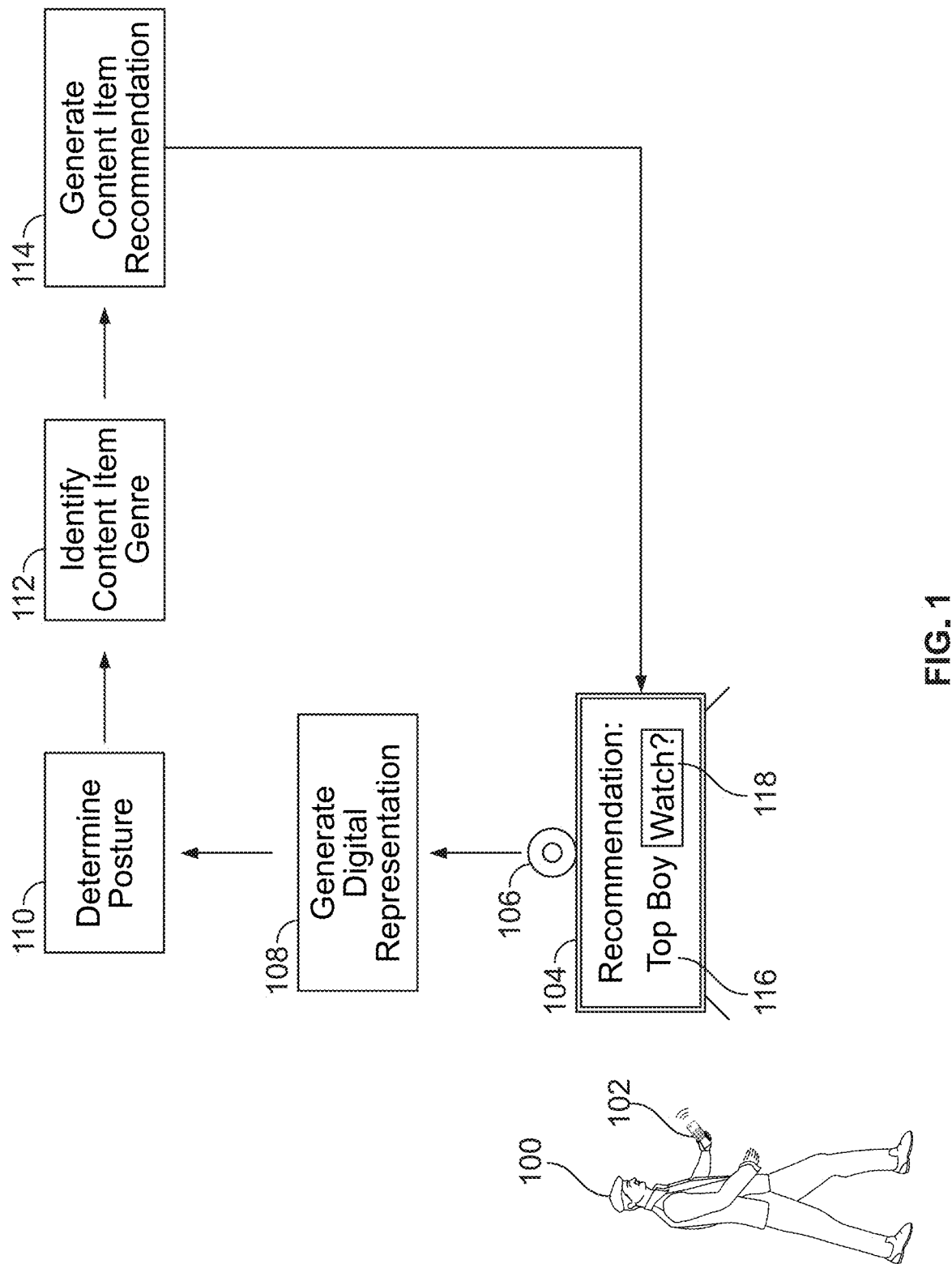
FIG. 1 shows an example environment in which a content item recommendation is generated based on an identified posture, in accordance with some embodiments of the disclosure.

FIG. 1 shows an example environment in which a content item recommendation is generated based on an identified posture, in accordance with some embodiments of the disclosure. The environment comprises a user 100, a remote control 102, a smart television 104, and a camera 106. An input command is generated at the remote control 102, for example, when the user 100 presses a button on the remote control 102. The remote control transmits the command to the smart television 104 via, for example, infrared, Bluetooth and/or Wi-Fi. The remote control 104 may comprise physical buttons, one or more touchscreens and/or a combination of the both. In other examples, the remote control 104 may comprise an application running on a computing device, such as a smartphone and/or a tablet device, that is in communication with software running on the smart television 104. In other examples, the smart television 104 may be any appropriate computing device, such as a smart phone and/or tablet device. The input command may be a command to open an application associated with an OTT, streaming and/or VOD service (or platform). On opening the service, the camera 106 takes a capture. As the user would typically be in front of the smart television 104, it is anticipated that the capture would include the user; however, in some examples, for example, motion tracking and a moveable camera may be used to help ensure that the user is included in the capture. The camera 106 may be integral to the smart television 104. In other examples, as discussed in connection with FIG. 3 below, the camera 106 may be separate from the smart television 104. The camera 106 may be replaced, or supplemented, with any other suitable capture device that can generate a digital representation of the user from which a user posture can be determined. Examples of other, or additional, capture devices include a video camera, a stereo camera, a LiDAR device, a Microsoft Kinect device, a device comprising ultrasonic sensor and/or a device comprising a laser sensor.

A digital representation of the user 100 is generated 108 from the camera 106 capture. The digital representation of the user may be any digital representation, including, for example, a raw image file; a compressed image file; any unprocessed, or processed, data from a sensor; and/or a set of coordinates generated from the capture, wherein the coordinates may represent user joints. Based on the digital representation, a user posture is determined 110. For example, in order to aid with posture determination, skeletal joints of a user may be identified in the digital representation. The posture of the user may be determined locally, at the smart television 104. In some examples, the user posture may be determined via a trained algorithm. The smart television 104 may comprise, for example, an artificial intelligence accelerator chip, such as a Google Tensor chip, or a Samsung Exynos chip, which may be used in determining the posture of the user. Postures include sitting, standing, lying down, and sitting upright. A determined posture may have a confidence level associated with it. In some examples, an additional capture of the user may be taken if the confidence level is below a threshold level. In another example, if a posture cannot be determined with a confidence level that is above a threshold level, for example, 55%, then the process may stop and a default recommendation may be generated for display, and displayed at the smart television 104. In some examples, more than one posture may be associated with a user, for example, 10% sitting, 82% lying down, indicating that it is more likely that the user is lying down than sitting. In some examples, the determined posture may be mapped to a preset group of postures. For example, a system may be configured to only identify whether a user is standing or sitting, and, for example, if the user is lying down, the user may be identified as sitting, as lying down is closer to sitting than it is to standing. Based on the identified posture, a content item genre is identified 112. For example, if the user posture is determined to be a standing up posture, this may be associated with the crime genre. In some examples, postures may be mapped to genres via an updatable lookup table. Following the identification of the genre, a content item recommendation is generated 114. For example, a recommendation for the crime drama "Top Boy" may be generated. The OTT application then displays the generated recommendation 116 to the user, via a display of the smart television 104. In some examples, the user can select the recommendation, or a user interface element, such as a "Watch?" icon 118, associated with the recommendation, to play the recommended content item. On selecting the "Watch?" icon 118, the recommended content item is transmitted to the smart television 104. In some examples (not shown), a user interface element enabling the recommendation to be ignored is displayed at the smart television 104.

One way for a content item delivery service to utilize the posture identification and subsequent recommendation generation is for new users with no viewing history to access the service from a computing device that can determine, or estimate, their current posture (or form). For example, the capabilities of the computing device can be determined from the vendor or data sheets of the device that a user is using to access the service (e.g., by using a user-agent request header). In some examples, there can be a database of devices and their capabilities with respect to, for example, 3D scanning and/or determining user form.

In some examples, user feedback with respect to the recommendation may be generated by monitoring how a user reacts to a content item recommendation. For example, user interactions with the recommendation may be monitored, for example, how often a user selects the recommendation or ignores the recommendation. In some examples, this feedback may be transmitted to a server, for example, in a manner similar to that discussed in connection with FIG. 2 below. In some examples, this feedback may be used to update a posture-to-genre mapping table associated with the user, or with users, of a content item delivery service.

In some examples, a multi-relational (or knowledge) graph is generated, where a posture can be an edge that connects content items, such as movies, to postures, such as lying down and/or sitting upright. Entities in such a multi-relational graph are represented, or modeled, as vertices (objects) with a unique identification (ID) and properties (such as key-value pairs) and are connected to other objects via edges (that also have a unique ID and properties) that describe the relationship between the objects. For example, the properties of an object can be related to a content item, such as a movie name, genre and/or a release date. The type of the relationship (property type of the edge) between two movies can be, for example, "type: Sequel," "type: Prequel," "type: Series," and/or "type: Second Season." Source and target nodes may have multiple edges between them, and these edges can have multiple properties. In one example, the graph may comprise a NoSQL graph database (semantic graph database) that may be queried based on the property type of the edge that is of, for example, "type: body form" upon determining that the user is a new subscriber to a content item delivery service. This enables a recommendation system associated with the service to recommend content items to the new users based on how existing users (or subscribers) consumed content items from the service, e.g., lying down and/or sitting up straight. In another example, the graph database may be populated with "initial_form" data, that comprises the identified posture (or body form) of a user during the browsing/selection phase of a content item, such as a movie.

Data for the multi-relational graph can be collected from existing users of a content item delivery service and can be used to augment the multi-relational graph. For example, an OTT service can request permission to collect posture and body tracking information via a smart television with an integrated depth camera, or, for example, where users view content items via one or more applications running on a gaming console with capabilities that enable a user posture to be determined (e.g., an Xbox One S connected to a Kinect). In some examples, a user's real image (such as a picture of the user) is not directly used, or saved, but rather a posture estimation can be extracted from a depth map of the user's settings, including, for example, detecting and tracking multiple bodies at the same time (e.g., a couple sitting on a couch). Additionally, as described herein, the computing devices can include artificial intelligence processors (or accelerator chips) for determining a value associated with a posture (e.g., predefined mapping that includes scales for leaning right and/or left). The posture data collected from existing subscribers may be transmitted to a backend analytics service. Based on the amount of data collected, the most common posture among a set of users can be identified and associated with a genre and/or a specific content item, content items and/or series of content items. The database and/or multi-relational graph may be further updated as more postures (or body form analysis) are identified, and the edges of the multi-relational graph between content items, such as movies, and postures can be changed to reflect the identified postures of the existing users.

Figure 2:
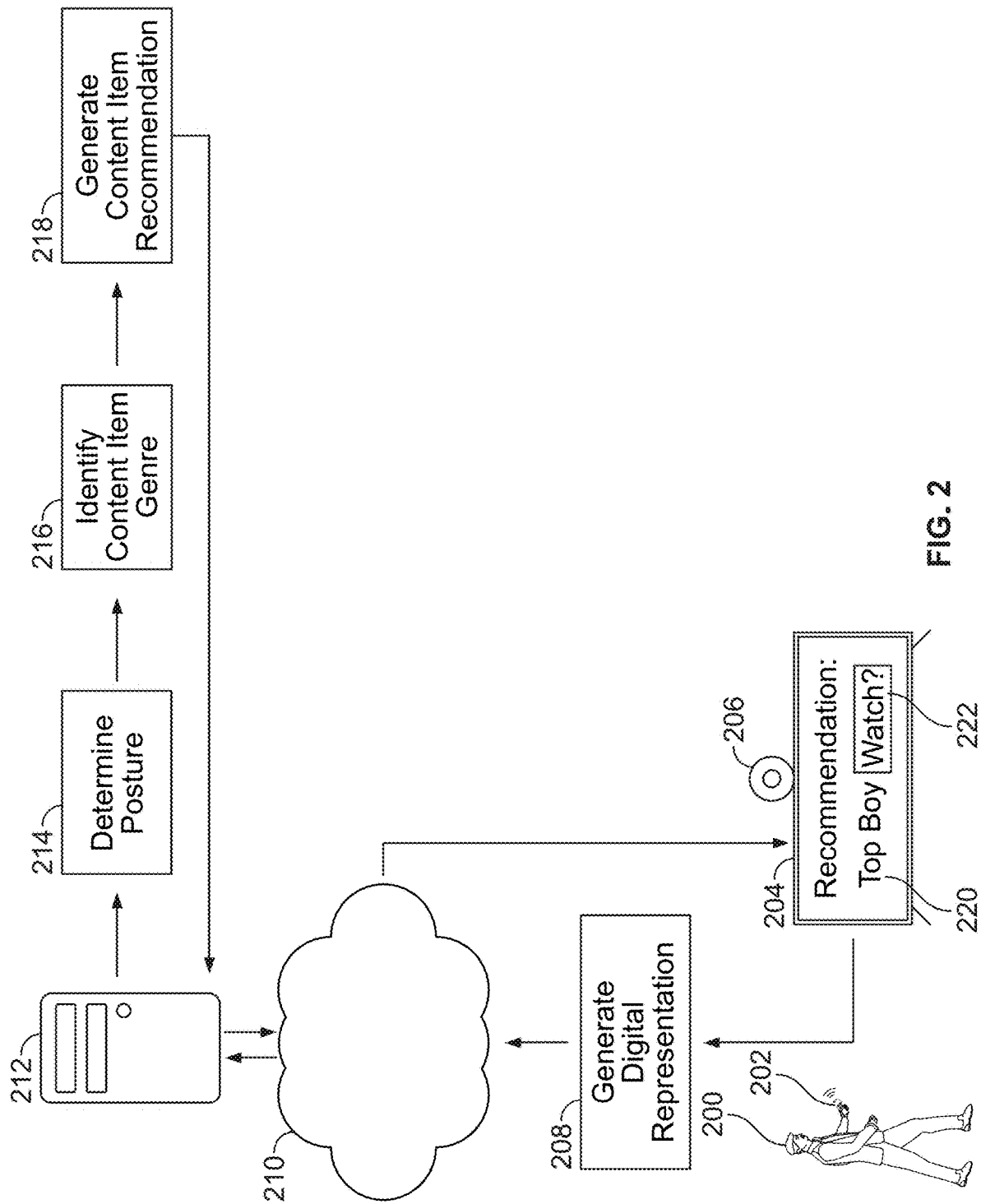
FIG. 2 shows another example environment in which a content item recommendation is generated based on an identified posture, in accordance with some embodiments of the disclosure.

FIG. 2 shows another example environment in which a content item recommendation is generated based on an identified posture, in accordance with some embodiments of the disclosure. In a similar manner to the environment shown in FIG. 1, the environment comprises a user 200, a remote control 202, a smart television 204, and a camera 206. In addition, the environment comprises a network 210 and a server 212. Again, an input command is generated at the remote control 202, for example, when the user 200 presses a button on the remote control 202. The input command may be a command to open an application associated with an OTT, streaming and/or VOD service (or platform). On opening the service, the camera 206 takes a capture. In this example, the camera 206 is integral to the smart television 204; however, it may be remote from the smart television 204 in the manner discussed in connection with FIG. 3 below. A digital representation of the user 200 is generated 208 from the camera 206 capture. The digital representation of the user 200 is transmitted via network 210, such as the internet, to server 212. The network 210 may comprise wired and/or wireless means. Software running at the server 212 determines 214 a posture of the user. Based on the identified posture, a content item genre is identified 216. Following the identification of the genre, a content item recommendation is generated 218. For example, a recommendation for the crime drama "Top Boy" may be generated. The recommendation is transmitted from the server 212, via network 210, to the smart television 204. The OTT application then displays the generated recommendation 220 to the user, via a display of the smart television 204. In some examples, the user can select the recommendation, or a user interface element, such as a "Watch?" icon 222, associated with the recommendation, to play the recommended content item. On selecting the "Watch?" icon 222, the recommended content item is transmitted to the smart television 204. In some examples (not shown), a user interface element enabling the recommendation to be ignored is displayed at the smart television 204. The server 212 may comprise a single physical or virtual server. In other examples, the determining 214, identifying 216 and generating 218 processes may take place on different physical, or virtual servers. In some examples, the content item may be transmitted from the same server 212 that is used to perform any of the aforementioned processes 214, 216, 218. In other examples, the content item may be transmitted from a different server to a server that is used to perform any of the aforementioned processes 214, 216, 218.

Figure 3:
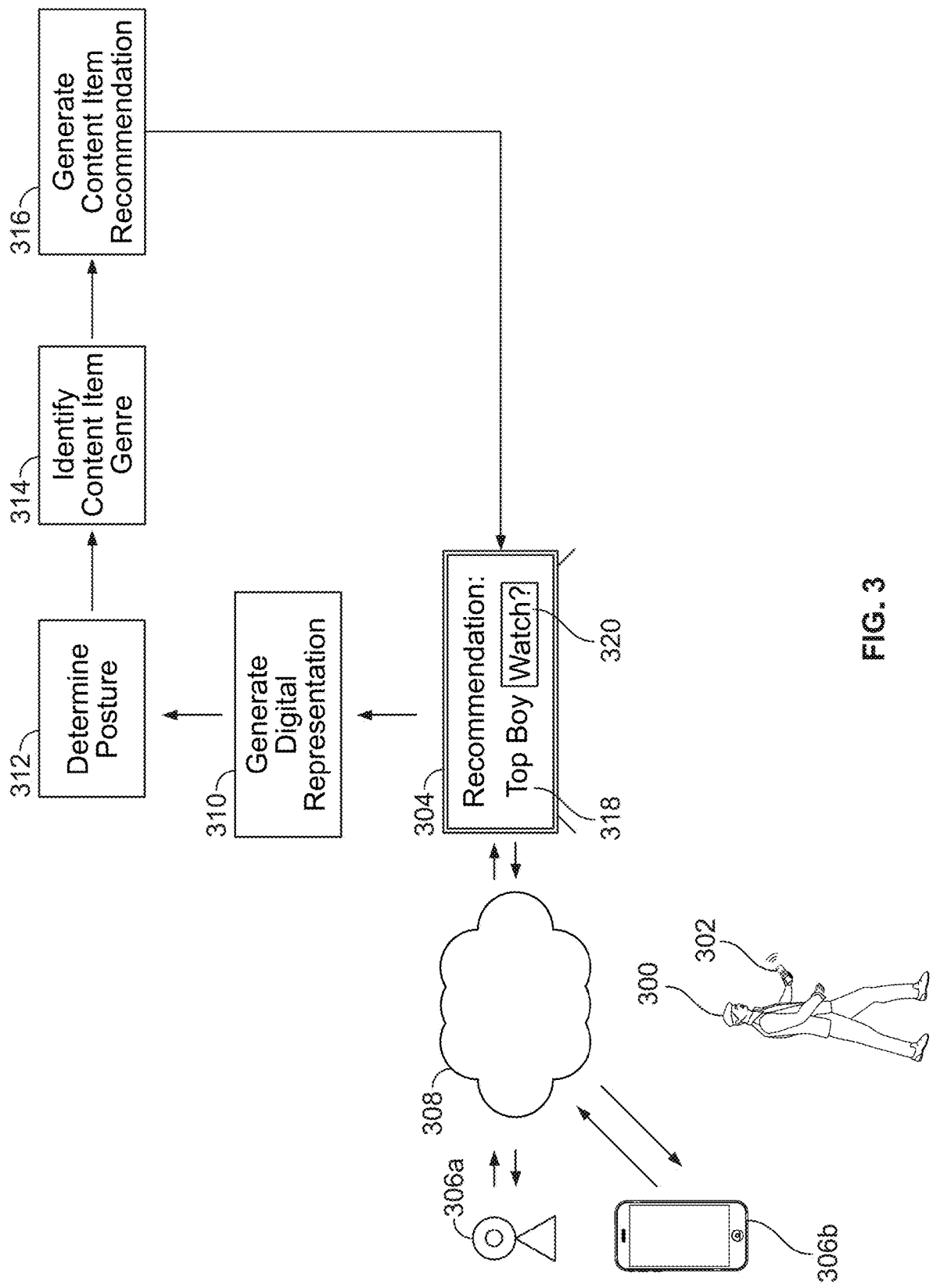
FIG. 3 shows another example environment in which a content item recommendation is generated based on an identified posture, in accordance with some embodiments of the disclosure.

FIG. 3 shows another example environment in which a content item recommendation is generated based on an identified posture, in accordance with some embodiments of the disclosure. In a similar manner to the environments shown in FIGS. 1 and 2, the environment comprises a user 300, a remote control 302, and a smart television 304. In addition, the environment comprises image capture devices 306a, 306b. Again, an input command is generated at the remote control 302, for example, when the user 300 presses a button on the remote control 302. The input command may be a command to open an application associated with an OTT, streaming and/or VOD service (or platform). On opening the service, an image capture device 306a, 306b takes a capture. Rather than an integral image capture device, such as the aforementioned cameras 106, 206, the image capture devices 306a, 306b are remote from the smart television 304. In this example, the image capture devices comprise a Wi-Fi enabled camera 306a and a smart phone 306b; however, the image capture device could be any of the image capture devices mentioned previously. In this example, two image capture devices are indicated; however, any number of image capture devices are contemplated, included one, three, five and ten image capture devices. Captures may be taken from a single image capture device, or from multiple capture devices. In some examples, an initial capture is taken and, if a confidence level associated with a posture is below a threshold level, an image from an additional (or the same) capture device may be taken. On opening the service, an image capture device 306a, 306b takes a capture and transmits it via, for example, a local network to the smart television 304. The local network may comprise wireless and/or wired means. A digital representation of the user 300 is generated 310 from the capture. A posture of the user is determined 312 based on the digital representation. Based on the identified posture, a content item genre is identified 314. Following the identification of the genre, a content item recommendation is generated 316. For example, a recommendation for the crime drama "Top Boy" may be generated. The OTT application then displays the generated recommendation 318 to the user, via a display of the smart television 304. In some examples, the user can select the recommendation, or a user interface element, such as a "Watch?" icon 320, associated with the recommendation, to play the recommended content item. On selecting the "Watch?" icon 320, the recommended content item is transmitted to the smart television 304. In some examples (not shown), a user interface element enabling the recommendation to be ignored is displayed at the smart television 304. Any data relating to the described processes 312, 314, 316 may be transmitted via a network (not shown) to a remote server, where one or more of the processes 312, 314, 316 may be performed, in a manner similar to that shown in FIG. 2. The output of any of the processes 312, 314, 316 may be transmitted back to the smart television 304, in a manner similar to that shown in FIG. 2.

Figure 4:
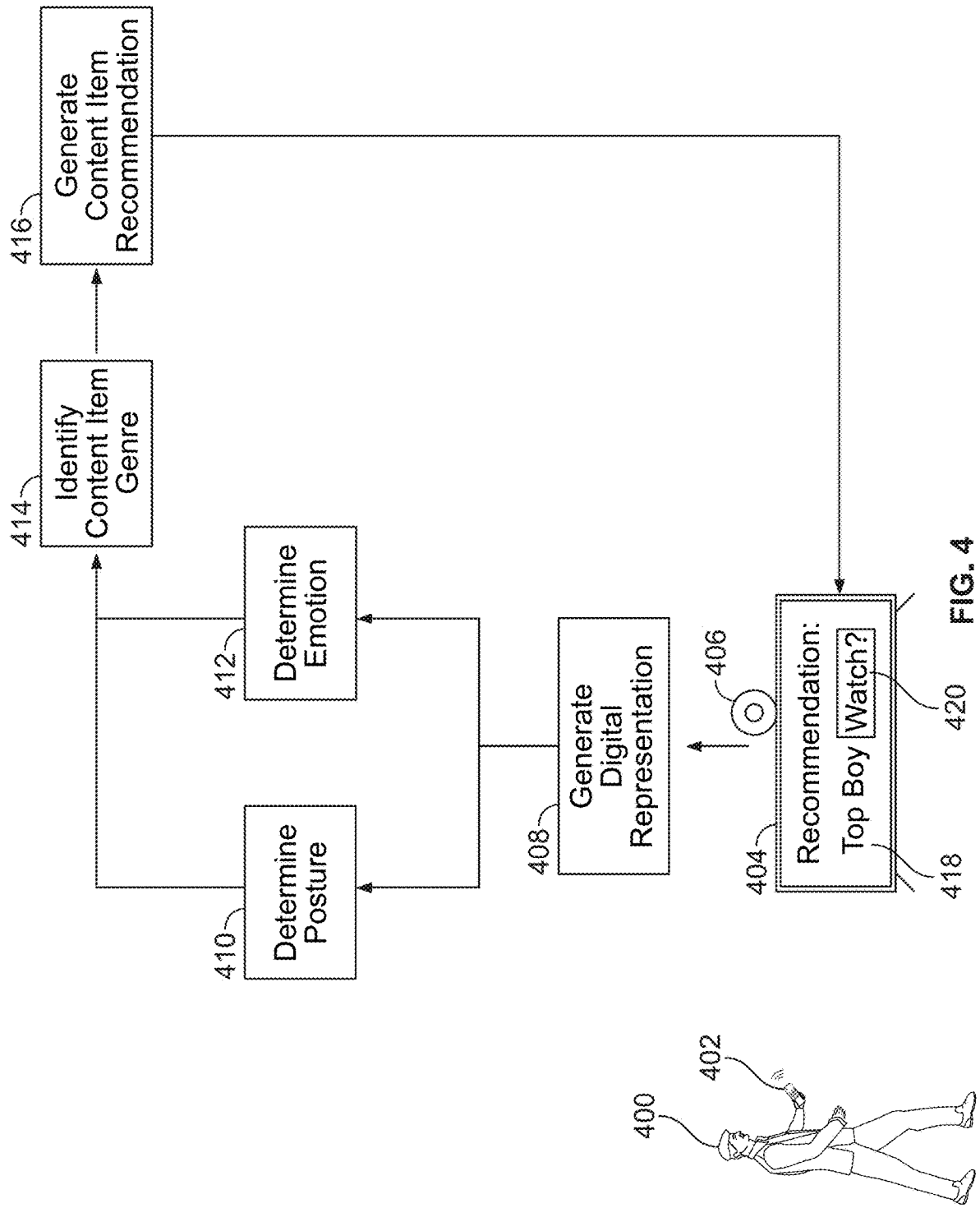
FIG. 4 shows another example environment in which a content item recommendation is generated based on an identified posture, in accordance with some embodiments of the disclosure.

FIG. 4 shows another example environment in which a content item recommendation is generated based on an identified posture, in accordance with some embodiments of the disclosure. In a similar manner to the environment shown in FIGS. 1, 2, and 3, the environment comprises a user 400, a remote control 402, a smart television 404, and a camera 406. Again, an input command is generated at the remote control 402, for example, when the user 400 presses a button on the remote control 402. The input command may be a command to open an application associated with an OTT, streaming and/or VOD service (or platform). On opening the service, the camera 406 takes a capture. In this example, the camera 406 is integral to the smart television 404; however, it may be remote from the smart television 404 in the manner discussed in connection with FIG. 3. A digital representation of the user 400 is generated 408 from the camera 406 capture. Based on the digital representation, a posture of the user 400 is determined 410 and an emotion of the user is also determined 412. In some examples, the emotion of the user may be determined independent of the posture of the user. In other examples, the emotion of the user may be determined based of the posture of the user. In some examples, the emotion of the user is determined locally, at the smart television. In some examples, the user emotion may be determined via a trained algorithm. The smart television may comprise, for example, an artificial intelligence accelerator chip, such as a Google Tensor chip, or a Samsung Exynos chip, which may be used in determining an emotion of the user. In other examples, the capture of the user is transmitted via a network, such as the internet, to a server. Software running at the server may determine an emotion of the user, and an indication of the emotion may be transmitted back to the smart television and/or to a program running on another server (or the same server). Detecting emotion from movements is discussed in more detail in Sapiński T, Kamińska D, Pelikant A, Anbarjafari G. *Emotion Recognition from Skeletal Movements, Entropy*, Vol. 21, Issue 7 (July 2019), Article 646 (doi: 10.3390/e21070646), which is hereby incorporated by reference, and Melzer A, Shafir T, Tsachor R. P. *How Do We Recognize Emotion From Movement? Specific Motor Components Contribute to the Recognition of Each Emotion, Frontiers in Psychology*, Vol. 10 (July 2019), Article 1389 (doi: 10.3389/fpsyg.2019.01389), which is hereby incorporated by reference.

Based on the identified posture and emotion, a content item genre is identified 414. In some examples, only the emotion of a user may be determined, and the content item may be identified based on the emotion only. Following the identification of the genre, a content item recommendation is generated 416. For example, a recommendation for the crime drama "Top Boy" may be generated. The OTT application then displays the generated recommendation 418 to the user, via a display of the smart television 404. In some examples, the user can select the recommendation, or a user interface element, such as a "Watch?" icon 420, associated with the recommendation, to play the recommended content item. On selecting the "Watch?" icon 420, the recommended content item is transmitted to the smart television 404. In some examples (not shown), a user interface element enabling the recommendation to be ignored is displayed at the smart television 404. Any data relating to the described processes 410, 412, 414, 416 may be transmitted via a network (not shown) to a remote server, where one or more of the processes 410, 412, 414, 416 may be performed, in a manner similar to that shown in FIG. 2. The output of any of the processes 410, 412, 414, 416 may be transmitted back to the smart television 404, in a manner similar to that shown in FIG. 2.

Figure 5:
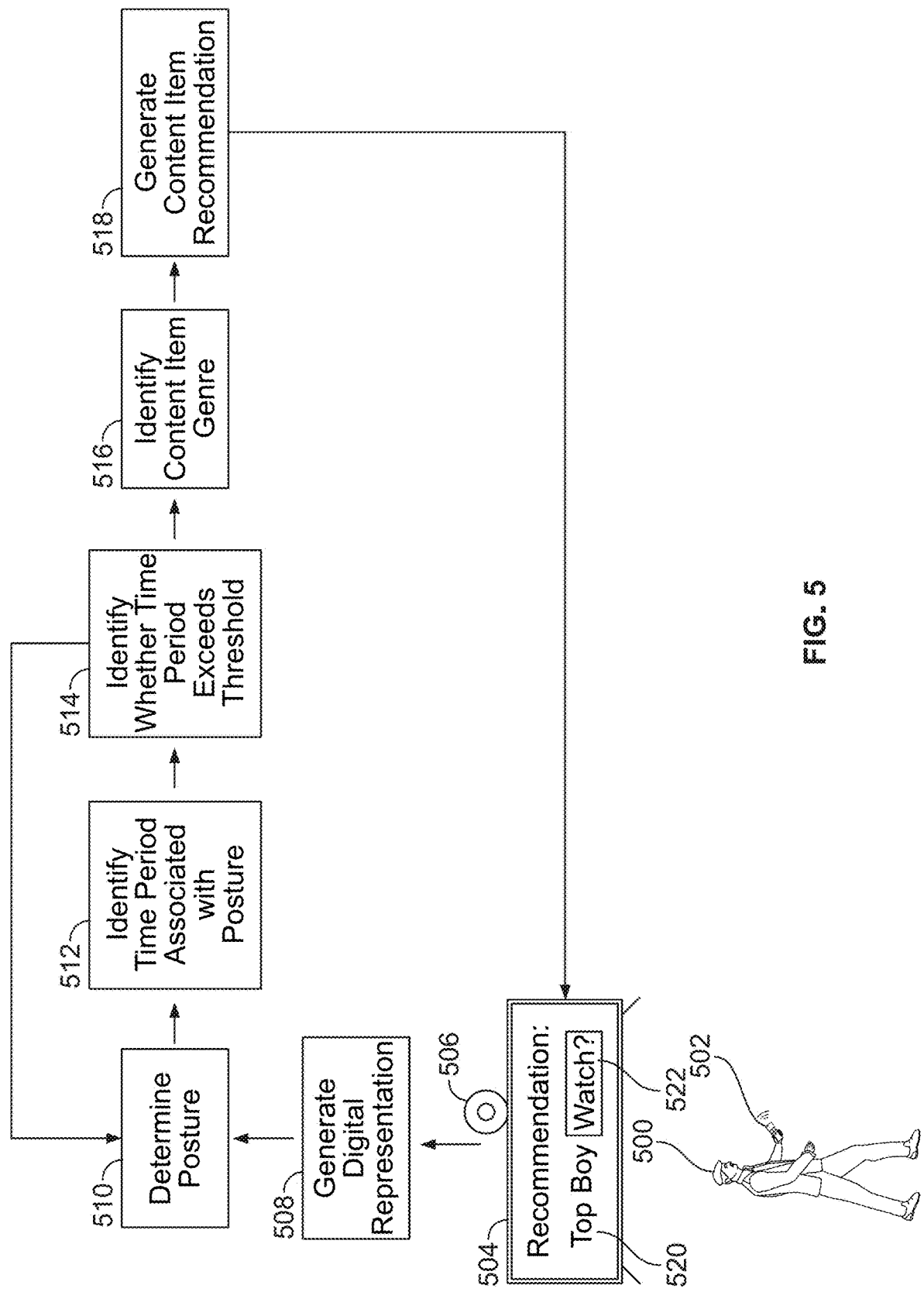
FIG. 5 shows another example environment in which a content item recommendation is generated based on an identified posture, in accordance with some embodiments of the disclosure.

FIG. 5 shows another example environment in which a content item recommendation is generated based on an identified posture, in accordance with some embodiments of the disclosure. In a similar manner to the environment shown in FIGS. 1-4, the environment comprises a user 500, a remote control 502, a smart television 504, and a camera 506. On opening the service, the camera 506 takes a capture. In this example, the camera 506 is integral to the smart television 504; however, it may be remote from the smart television 504 in the manner discussed in connection with FIG. 3. A digital representation of the user 500 is generated 508 from the capture. A posture of the user is determined 510 based on the digital representation. Once a posture of the user is determined 510, a time period is associated with the posture 512. For example, multiple captures could be taken of the user, at set periods such as every second, or every five seconds, in order to determine whether the user is continuing to stay in the identified posture. In another example, the output of a video camera could be used to determine whether the user is continuing to stay in the identified posture. In some examples, motion tracking may be used to keep track of the user and help ensure that the user is present in the capture. If the user stays in the same posture, for example, for 32 seconds, then the time period associated with the posture will be 32 seconds. It is identified 514 whether this time period exceeds a threshold. For example, the threshold may be set to two seconds, to avoid content recommendations being based on a posture identified when the user is moving from posture to posture. In addition, a first posture may be identified, such as "lying down" and a subsequent posture may be identified, such as "sitting down." Based on the identified posture and whether the identified posture exceeds a threshold, a content item genre is identified 516. Following the identification of the genre, a content item recommendation is generated 518. For example, a recommendation for the crime drama "Top Boy" may be generated. The OTT application then displays the generated recommendation 520 to the user, via a display of the smart television 504. In some examples, the user can select the recommendation, or a user interface element, such as a "Watch?" icon 522, associated with the recommendation, to play the recommended content item. On selecting the "Watch?" icon 522, the recommended content item is transmitted to the smart television 504. In some examples (not shown), a user interface element enabling the recommendation to be ignored is displayed at the smart television 504. Any data relating to the described processes 510, 512, 514, 516, 518 may be transmitted via a network (not shown) to a remote server, where one or more of the processes 510, 512, 514, 516, 518 may be performed, in a manner similar to that shown in FIG. 2. The output of any of the processes 510, 512, 514, 516, 518 may be transmitted back to the smart television 504, in a manner similar to that shown in FIG. 2.

Figure 6:
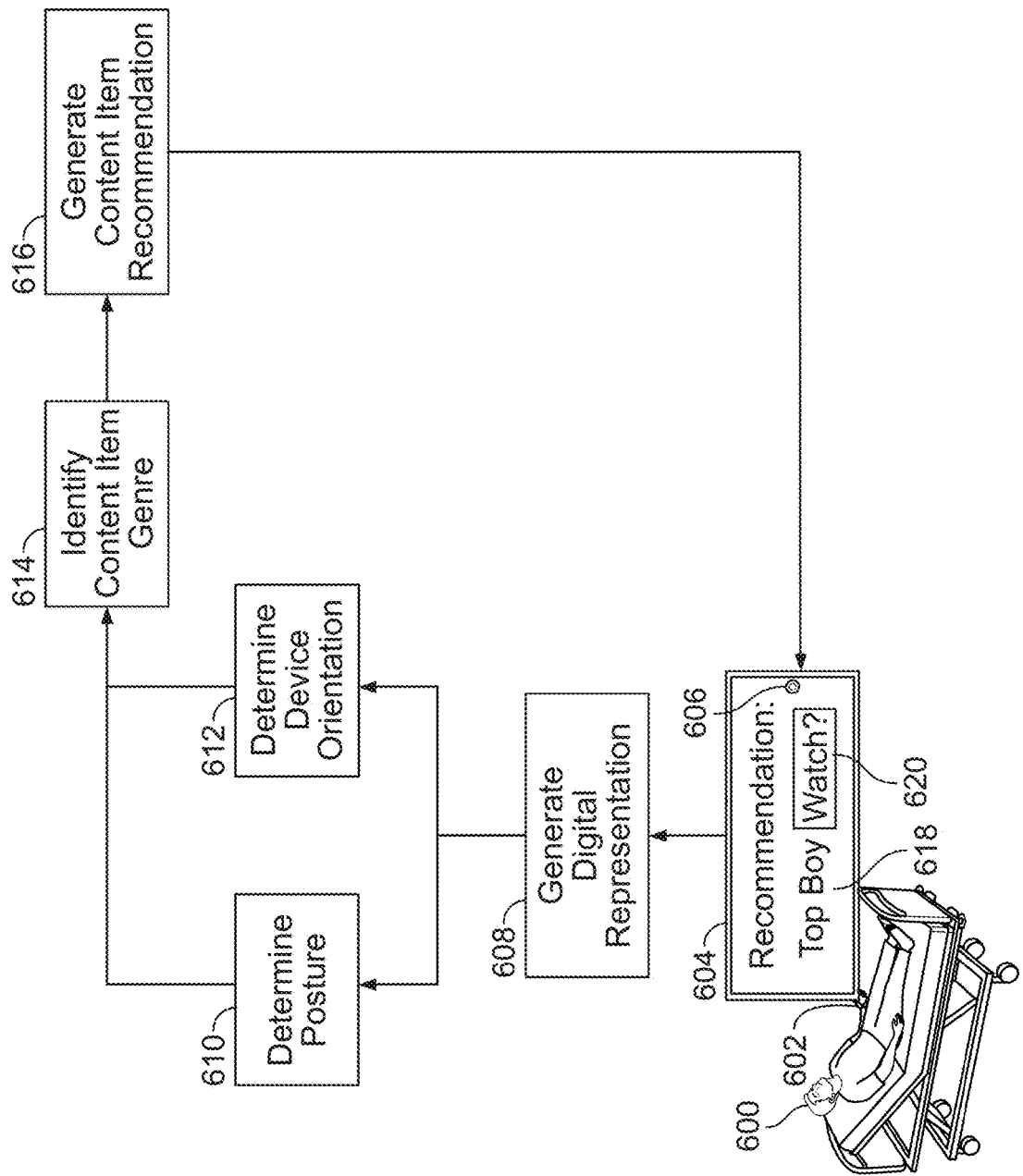
FIG. 6 shows another example environment in which a content item recommendation is generated based on an identified posture, in accordance with some embodiments of the disclosure.

FIG. 6 shows another example environment in which a content item recommendation is generated based on an identified posture, in accordance with some embodiments of the disclosure. In a similar manner to the environment shown in FIGS. 1-5, the environment comprises a user 600, and a camera 606. In addition, the environment comprises a tablet device 604 that is able to receive a user input via a touchscreen. An input is generated via a touch event 602 on the touch screen of the tablet device 604. The input command may be a command to open an application associated with an OTT, streaming and/or VOD service (or platform). On opening the service, the camera 606 takes a capture. In this example, the camera 606 is integral to the tablet device 604; however, it may be remote from the tablet device 604 in the manner discussed in connection with FIG. 3. A digital representation of the user 600 is generated 608 from the camera 606 capture. Based on the digital representation, a posture of the user 600 is determined 610. In addition, an orientation of the tablet device 604 is determined 612. The device orientation may be described via a coordinate system that measures, for example, three angles of the device. The angles may represent rotation of the device around the z-axis of a coordinate system, rotation of the device around the x-axis of a coordinate system, and rotation of the device around the y-axis of a coordinate system. These angles may be generated based on, for example, the output of a gyroscope integral to the tablet device 604. In another example, an external capture device may take a capture of the tablet device 604, and the orientation of the tablet device 604 may be determined via image processing.

Based on the identified posture and determined 612 device orientation, a content item genre is identified 614. In some examples, the device orientation may be utilized directly to identify 614 the content item genre. In other examples, the device orientation may be indirectly utilized to identify the content item genre, for example, by increasing a confidence level associated with an identified posture. For example, a user posture may be identified as "lying down," with a confidence level of 63%. Determining that the tablet device 604 is in a landscape orientation may increase this confidence level to, for example, 88%. Following the identification of the genre, a content item recommendation is generated 616. For example, a recommendation for the crime drama "Top Boy" may be generated. The OTT application then displays the generated recommendation 618 to the user, via a display of the tablet device 604. In some examples, the user can select the recommendation, or a user interface element, such as a "Watch?" icon 620, associated with the recommendation, to play the recommended content item. On selecting the "Watch?" icon 620, the recommended content item is transmitted to the tablet device 604. In some examples (not shown), a user interface element enabling the recommendation to be ignored is displayed at the tablet device 604. Any data relating to the described processes 610, 612, 614, 616 may be transmitted via a network (not shown) to a remote server, where one or more of the processes 610, 612, 614, 616 may be performed, in a manner similar to that shown in FIG. 2. The output of any of the processes 610, 612, 614, 616 may be transmitted back to the tablet device 604, in a manner similar to that shown in FIG. 2.

Figure 7:
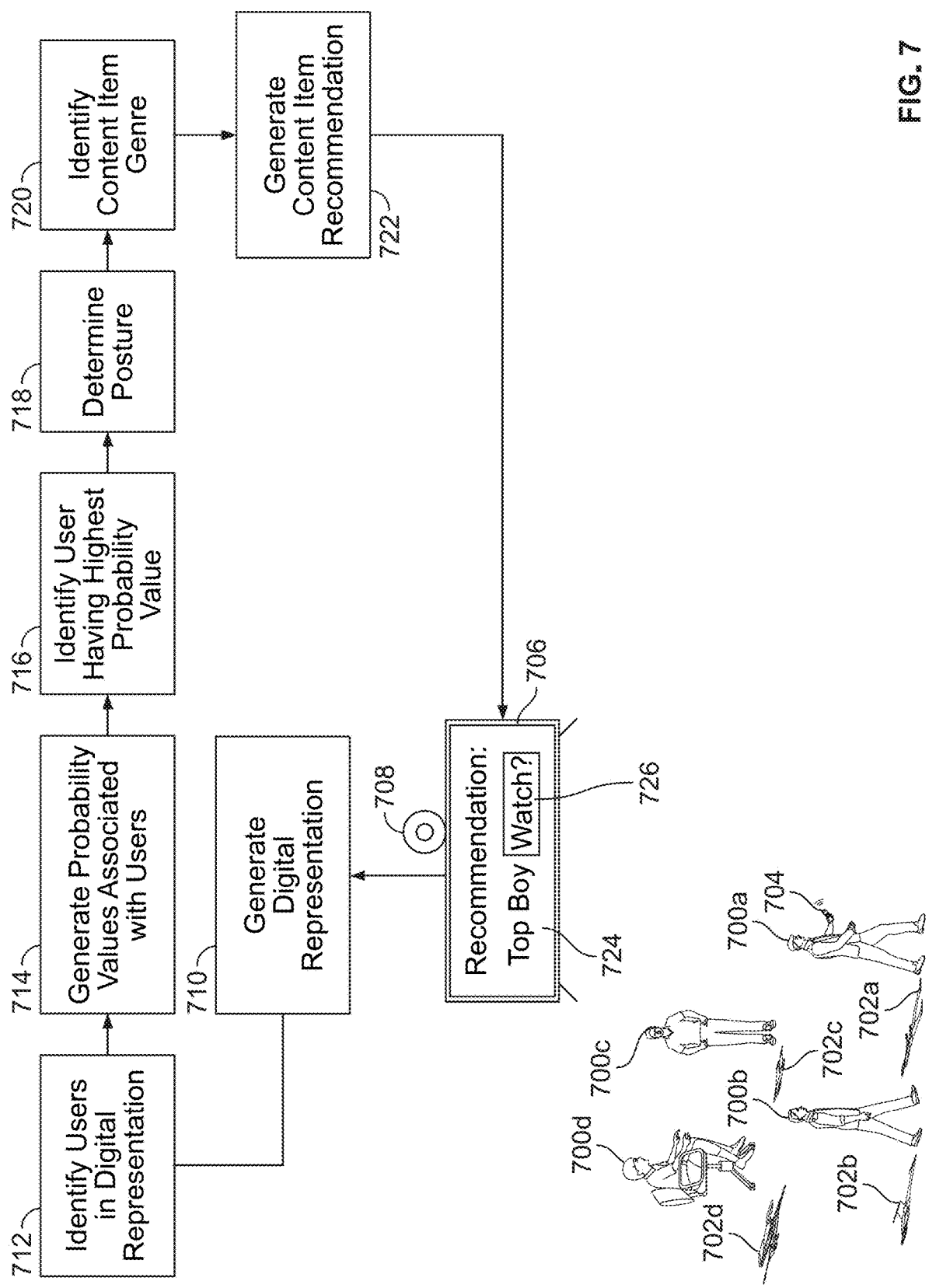
FIG. 7 shows another example environment in which a content item recommendation is generated based on an identified posture, in accordance with some embodiments of the disclosure.

FIG. 7 shows another example environment in which a content item recommendation is generated based on an identified posture, in accordance with some embodiments of the disclosure. In a similar manner to the environment shown in FIGS. 1-6, the environment comprises a remote control 704, a smart television 706, and a camera 708. In addition, the environment comprises multiple users 700*a*, 700*b*, 700*c* and 700*d*, each having a corresponding shadow, or silhouette, 702*a*, 702*b*, 702*c*, 702*d*. On opening the service, the camera 708 takes a capture of the users (or at least a subset of the users, in some examples). In this example, the camera 708 is integral to the smart television 706; however, it may be remote from the smart television 706 in the manner discussed in connection with FIG. 3. A digital representation of the users 700*a*, 700*b*, 700*c* and 700*d* (or at least a subset of the users, in some examples) is generated 710 from the capture. The users in the digital representation are identified 712. Identifying the users may comprise identifying the number of users (in this example, four) in the digital representation. In other examples, identifying the users may comprise identifying the users via, for example, facial recognition. In some examples, where the capture device is a Microsoft Kinect device, a command, such as "k4abt_frame_get_num_bodies( )" can be used to identify the number of users in a capture (or frame). In another example, the number of users can be determined via silhouette-based feature extraction. In some examples, any combination of known techniques can be used to identify the number of users. In some examples, the number of users may be determined via a trained algorithm. The smart television 706 may comprise, for example, an artificial intelligence accelerator chip, such as a Google Tensor chip, or a Samsung Exynos chip, which may be used in determining the number of users. In other examples, the capture of the users is transmitted via a network, such as the internet, to a server. Software running at the server may determine the number of users, and the number of users may be transmitted back to the smart television 706 and/or to a program running on another server (or the same server).

A probability value is associated 714 with each identified user in the capture, where the probability value indicates a probability of each user interacting with the service. The probability values may be determined locally, at the smart television 706. In some examples, probability values may be determined via a trained algorithm. Again, the smart television 706 may comprise, for example, an artificial intelligence accelerator chip, such as a Google Tensor chip, or a Samsung Exynos chip, which may be used in determining the probability values. In other examples, the capture of the users is transmitted via a network, such as the internet, to a server. Software running at the server may determine the probability values, and the probability values may be transmitted back to the smart television 706 and/or to a program running on another server (or the same server). For example, as user 700a is holding the remote control 704, a relatively high probability value may be assigned to that user, for example, 96%, and relatively low probabilities, for example, 1%, 2%, 1% may be assigned to users 700b, 700c and 700d. The user with the highest probability value is identified 716, in this example user 700a. In scenarios where two or more users have the same probability value assigned to them, an additional capture may be obtained and analyzed in order to determine whether an updated probability value can be generated for one or more of the users. In other examples, a prompt may be displayed at the smart television 706 requesting that a user whose posture is to be identified is selected. In some examples, the prompt may comprise, for example, user faces taken from the capture of the users. In other examples, the prompt may indicate that the user whose posture is to be identified should perform an action, such as waving, or jumping. In some examples, a tiebreak criterion may be applied, for example, one of the users may be chosen randomly. In other examples, where the probability values are within a threshold amount, for example, 3%, the users may be treated as having the same probability value and the aforementioned steps may be carried out.

A posture of the identified user is determined 718 based on the digital representation. Based on the identified posture, a content item genre is identified 720. Following the identification of the genre, a content item recommendation is generated 722. For example, a recommendation for the crime drama "Top Boy" may be generated. The OTT application then displays the generated recommendation 724 to the user, via a display of the smart television 706. In some examples, the user can select the recommendation, or a user interface element, such as a "Watch?" icon 726, associated with the recommendation, to play the recommended content item. On selecting the "Watch?" icon 726, the recommended content item is transmitted to the smart television 706. In some examples (not shown), a user interface element enabling the recommendation to be ignored is displayed at the smart television 706. Any data relating to the described processes 712, 714, 716, 718, 720, 722 may be transmitted via a network (not shown) to a remote server, where one or more of the processes 712, 714, 716, 718, 720, 722 may be performed, in a manner similar to that shown in FIG. 2. The output of any of the processes 712, 714, 716, 718, 720, 722 may be transmitted back to the smart television 706, in a manner similar to that shown in FIG. 2.

In some examples, multiple skeletons (users) can be tracked and identified from a generated depth image, and an ID can be assigned to each skeleton. Where multiple users are present, e.g., sitting on a couch, the pose of the person browsing the service can be used to initially recommend content, for example, as described in connection with FIG. 7. Additionally, if the users present have different postures, then, for example, several postures can be used. The person that is browsing the service can be identified if the person is holding a device such as a remote control or extending his or her arm out, again, for example, as described in connection with FIG. 7.

Figure 8:
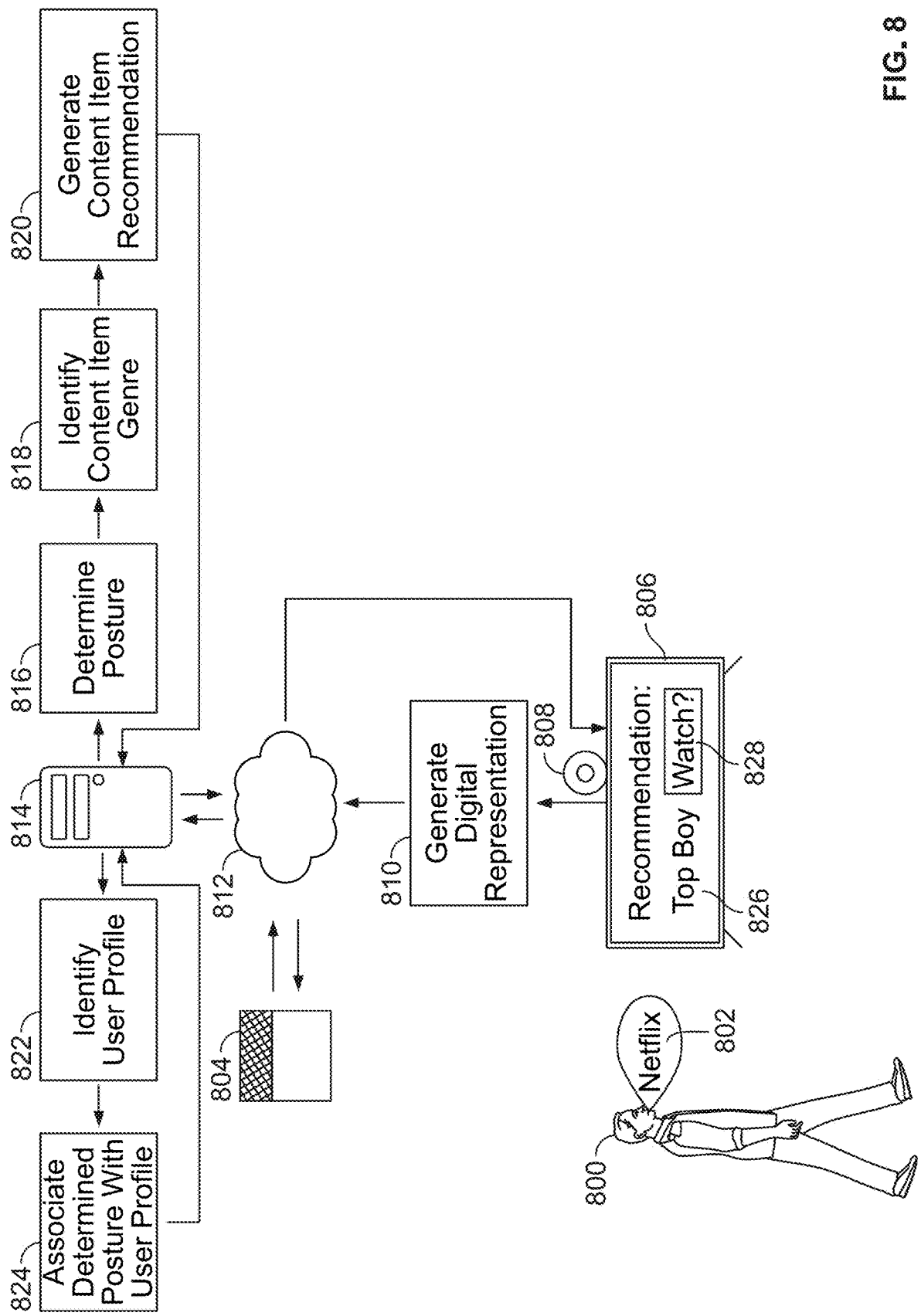
FIG. 8 shows another example environment in which a content item recommendation is generated based on an identified posture, in accordance with some embodiments of the disclosure.

FIG. 8 shows another example environment in which a content item recommendation is generated based on an identified posture, in accordance with some embodiments of the disclosure. In a similar manner to the environments shown in FIGS. 1-7, the environment comprises a user 800, a smart television 806, and a camera 808. In addition, the environment comprises a smart speaker 804 (e.g., an Amazon Alexa device), network 812 and a server 814. A spoken input command is generated at the smart speaker 804, for example, when the user 800 speaks a command 802 such as "Netflix". The smart speaker 804 receives the spoken input command and transmits it to the smart television 806. The smart speaker 804 may be connected to the smart television 806 via network 812, which may comprise a local network and a wide area network, such as the internet. The network 812 may comprise wired and/or wireless means. In other examples, the smart speaker 804 may transmit the command to the smart television 806 via infrared, Bluetooth and/or a direct Wi-Fi connection. The input command may be a command to open an application associated with an OTT, streaming and/or VOD service (or platform). On opening the service, the camera 808 takes a capture. In this example, the camera 808 is integral to the smart television 806; however, it may be remote from the smart television 806 in the manner discussed in connection with FIG. 3. A digital representation of the user 800 is generated 810 from the camera 808 capture. The digital representation of the user 800 is transmitted, via network 812, to server 814. Software running at the server 814 determines 816 a posture of the user. Based on the identified posture, a content item genre is identified 818. Following the identification of the genre, a content item recommendation is generated 820. For example, a recommendation for the crime drama "Top Boy" may be generated. The recommendation is transmitted from the server 814, via network 812, to the smart television 806. The OTT application then displays the generated recommendation 826 to the user, via a display of the smart television 806. In some examples, the user can select the recommendation, or a user interface element, such as a "Watch?" icon 828, associated with the recommendation, to play the recommended content item. On selecting the "Watch?" icon 828, the recommended content item is transmitted to the smart television 806. In some examples (not shown), a user interface element enabling the recommendation to be ignored is displayed at the smart television 806. At the server 814, a user profile associated with a content item delivery service is identified 822. For example, the spoken input may be analyzed using voice recognition software and the user profile may be identified 822 based on the analyzing of the spoken input. Analyzing the input may comprise comparing the spoken input to a stored voiceprint and/or via voice identification. In some examples, a voiceprint of the user, or any other means to identify the voice of a user, may be stored at, for example, a server, and accessed. A user may provide (directly, or indirectly) a voiceprint, or any other means of identifying the voice of a user, via another service, such as via an Amazon, Google and/or Apple service. In some examples, a voiceprint, or other means to identify the voice of the user, may be accessed, if the user profile is linked to one or more of these services. The determined posture is then associated 824 with the user profile. The server 814 may comprise a single physical or virtual server. In other examples, the determining 816, identifying 818, generating 820, identifying 822 and associating 824 processes may take place on different physical or virtual servers. In some examples, the content item may be transmitted from the same server 814 that is used to perform any of the aforementioned processes 816, 818, 820, 822, 824. In other examples, the content item may be transmitted from a different server to a server that is used to perform any of the aforementioned processes 816, 818, 820, 822, 824.

Figure 9:
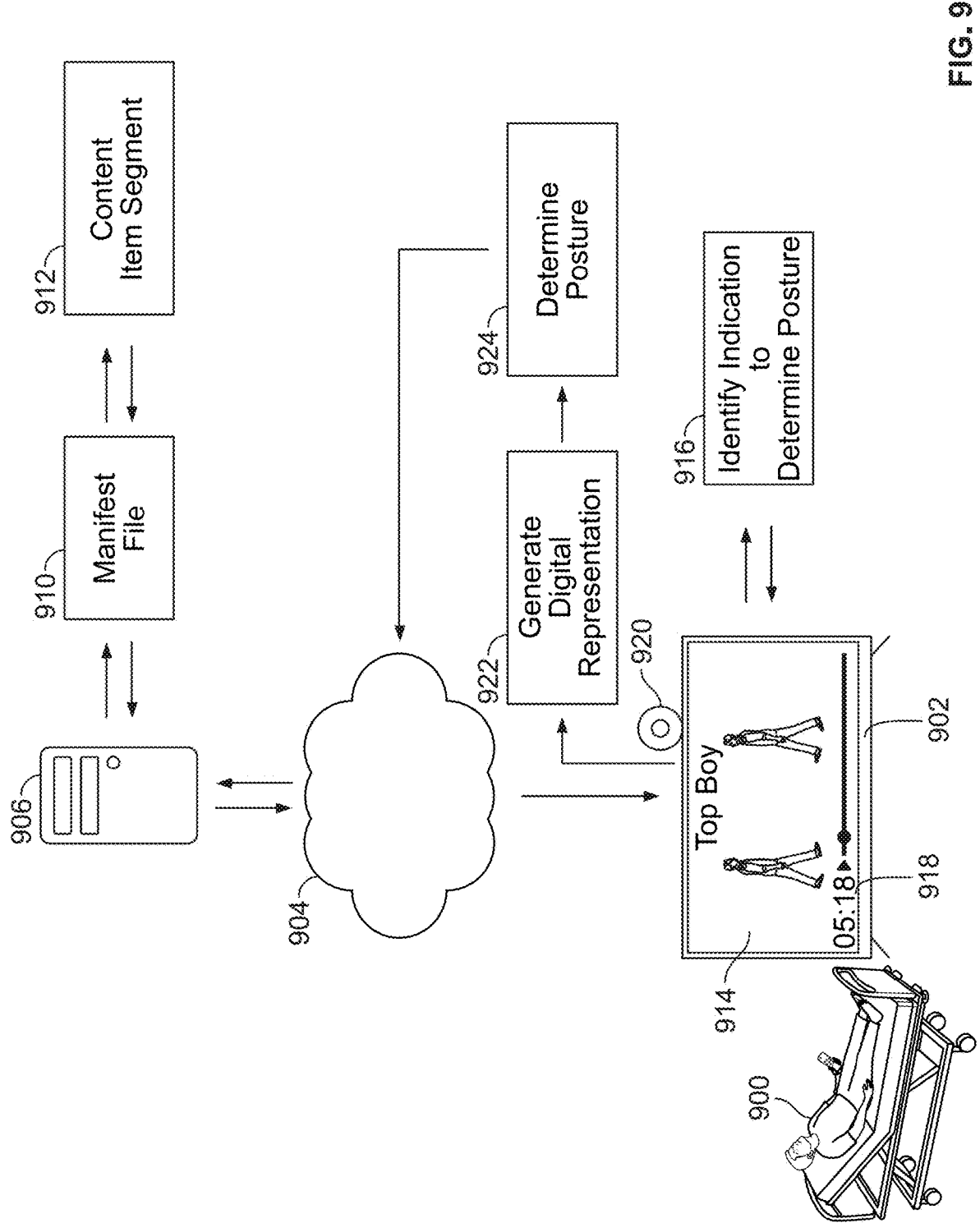
FIG. 9 shows another example environment in which a content item recommendation is generated based on an identified posture, in accordance with some embodiments of the disclosure.

FIG. 9 shows another example environment in which a content item recommendation is generated based on an identified posture, in accordance with some embodiments of the disclosure. In a similar manner to the environments shown in FIGS. 1-8, the environment comprises a user 900, a smart television 902, and a camera 920. In addition, the environment comprises a network 904 and a server 906. The environment depicted in FIG. 9 typically follows one of the aforementioned environments, in that a content item has already been selected. The content item is delivered to smart television 902 via network 904, such as the internet, from server 906. Network 904 may comprise wired and/or wireless means. At the server 906, a manifest file 910 for the content item is stored and/or generated. The manifest file 910 is transmitted from the server 906 to the smart television 902. The smart television 902 accesses the manifest file 910 to identify segments 912 of the content item to request. On receiving a request, the server 906 (or another physical and/or virtual server) transmits the requested content item segment 912 to the smart television 902 via network 904. In addition to enabling the smart television 902 to request segments 912 of a content item 914, the manifest file 910 may comprise an indicator (or tag) that a posture of the user should be determined. This indicator may have a playback time associated with it, so that the posture is determined at a specified playback time. On processing the manifest file 910, the smart television 902 may identify 916 an indication to determine the posture of the user at a specified playback time. In this example, the specified playback time is 05:18. On the content item 914 reaching the specified playback time 918, a capture of the user 900 is taken via camera 920. In this example, the camera 920 is integral to the smart television 902. In other examples, as discussed in connection with FIG. 3, the camera 920 may be separate from the smart television 902. A digital representation of the user 900 is generated 922 from the camera 920 capture. Based on the digital representation, a posture of the user 900 is determined 924 and is transmitted via network 904 to the server 906 (or another server). In some examples, the digital representation may be transmitted to server 906 (or another server), via network 904, such that the posture determination is performed at the server 906.

For example, the collected data may be used to determine how many users stood up and walked away during an advertisement. In another example, the postures of users may be identified during a specific time period or scene (e.g., a major event is occurring). Since this data is collected from individual computing devices and/or media players that are associated with different users, it can be used to recommend content based on the users' posture and, for example, may be used to adjust a frequency of advertisements that are displayed on the computing device.

Figure 10:
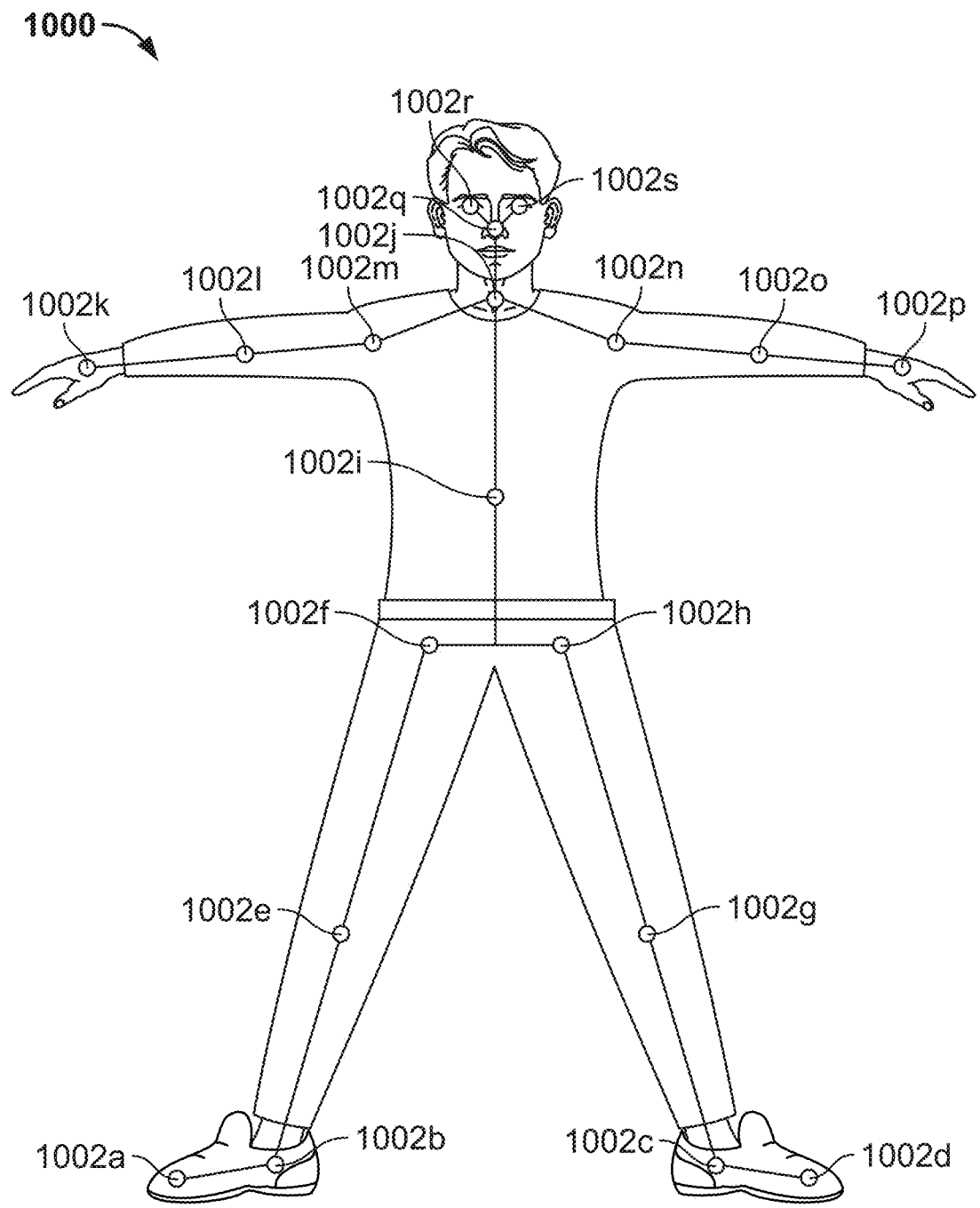
FIG. 10 shows a schematic joint mapping for a representation of a user, in accordance with some embodiments of the disclosure.

FIG. 10 shows a schematic joint mapping for a representation of a user, in accordance with some embodiments of the disclosure. A plurality of joints are mapped onto a digital representation of a user 1000, in order to aid with determining a posture of the user 1000. In this example, a joint 1002a represents a right foot and a joint 1002b represents a right ankle. Likewise, a joint 1002c represents a left ankle and a joint 1002d represents a left foot. Joints 1002e, 1002g represent right and left knees, and joints 1002f and 1002h represent right and left hips. Joint 1002i represents a spine, and joint 1002j represents a neck. Joints 1002k, 1002l and 1002m represent a right hand, a right elbow and a right shoulder respectively. Similarly, joints 1002n, 1002o and 1002p represent a left shoulder, a left elbow and a left hand respectively. Joint 1002q represents a nose and joints 1002r and 1002s represent right and left eyes. In some examples, more joints may be utilized. In other examples, fewer joints may be utilized. The number of joints utilized may represent a desired balance between accuracy of posture identification and required computing power.

Accurate joint tracking is not essential for identifying a posture. For example, some applications (e.g., hands-free gaming) might require the tracking of many joints (e.g., 32 joints) in order to interpret the movement of a user. However, for a posture estimation, comparing a depth image to pre-existing collection of labelled depth images may suffice. Additionally, extracting a silhouette contour of a user to get an accurate count of the users present within the view of the depth sensor can also be utilized to determine user counts (and also, for example, to determine if a user is lying down). There are existing computer vision techniques that can be used to estimate a human pose by using key points such as hips and/or knees.

To detect which user is providing input, only data related to the joints or key points that are associated with the arms may be needed to determine an extension of one of the arms out that is, for example, holding a remote control. Stored collections (e.g., skeletal structures) of different ways that a human holds a remote control, or what the depth image looks like when a human hand is holding a remote control, may be utilized for comparison, in real time. In general, data on movements of the joint, or joints, that are required for the user to perform a specific action or assume a posture may be captured in order to determine what posture the user is in (e.g., walking, sitting, lying down).

Microsoft's Kinect technology can be integrated within computing devices such as smart televisions, or can be connected to a gaming console if the user is accessing the content item delivery service from, for example, an Xbox One S. The Kinect comprises various sensors including a red green blue (RGB) camera and a depth sensor that can be used to locate skeletal joints in 3D space and to track body movements.

FIG. 11 shows an example data table mapping posture to genre, in accordance with some embodiments of the disclosure. The table shown in FIG. 11 maps a posture 1100 with a genre 1102. In this example, the posture standing 1104a is mapped to the genre action 1106a, the posture sitting upright 1104b is mapped to the genre crime 1106b, the posture sitting lean 1104c is mapped to drama 1106c, and the posture lying down 1104d is mapped to comedy 1106d. In some examples, the table may be dynamically populated in response to user actions. For example, it may be identified that a user rarely accepts a recommendation for action 1106a content items when they are identified to be standing 1104a. In this case, the system may monitor user postures to identify a typical posture that is associated with action 1106a content items and update the mapping table accordingly. In other examples, the mapping table may alternatively, or additionally, be populated via postures that are observed to be associated with different genres, based on input from a subscriber base. In some examples, the mapping table may also indicate confidence thresholds associated with each mapping. For example, it may be easier to identify that a user is standing 1104a, as opposed to sitting upright 1104b. In this case, standing 1104a may have a relatively high threshold associated with it, for example, 75%, and sitting upright 1104b may have a relatively low threshold associated with it, for example, 55%. In some examples, a genre may be mapped to multiple postures and/or a posture may be mapped to multiple genres. In some examples, a posture may have a time threshold associated with it, for example, a user may have to be in a standing 1104*a* posture for 80 seconds before it is mapped to the genre 1106*a*. In some examples, multiple genres may be weighted, based on a posture. For example, sitting upright 1104*b* may have a weighting of 20% action 1106*a* and 80% crime 1106*b*. Different users may have different weightings, which may be stored with a user profile. The mapping table may be updated in response to user feedback.

The posture-to-genre mapping table may comprise an initial mapping between postures and genres, and the table is updated based on the actions of a user. For example, the initial mapping for a lying down posture may be comedy, but it is determined that the user keeps ignoring comedy recommendations while they are lying down, and instead end ups selecting a drama movie to watch. In this example, the mapping table may be updated to reflect the user choices. Movement and body posture data can be unique to users within the same age group and/or within certain demographics. Therefore, user profile data can be used to further refine the recommendation, by making data such as the user age group and/or demographic available. Additionally, the posture (or form, or body movement) data can be unique for each user and may be used to recommend content to each individual user.

FIG. 12 shows a block diagram representing components of a computing device and data flow therebetween for generating a content item recommendation based on an identified posture, in accordance with some embodiments of the disclosure. Computing device 1200 (e.g., smart television 104, 204, 304, 404, 504, 706, 806, 902, tablet device 604) as discussed above comprises input circuitry 1204, control circuitry 1208 and output module 1234. Control circuitry 1208 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 1204. The input circuitry 1204 is configured to receive inputs related to a computing device. For example, this may be via an infrared controller, a Bluetooth and/or Wi-Fi controller of the computing device 1200, a touchscreen, a keyboard, a mouse and/or a microphone. In another example, the input may comprise instructions received via another computing device. The input circuitry 1204 transmits 1206 the user input to the control circuitry 1208.

The control circuitry 1208 comprises a capture initiation module 1210, a capture receiving module 1214, a digital representation generation module 1218, a posture determination module 1222, a genre identification module 1226 and a content item recommendation module 1230. The input is transmitted 1206 to the capture initiation module 1210, which initiates a capture by transmitting 1212 an indication to the capture receiving module 1214. On receiving the indication, the capture receiving module 1214 takes a capture of a user. The capture is transmitted 1216 to the digital representation generation module 1218, where a digital representation of the capture is generated. The digital representation is transmitted 1220 to the posture determination module 1222, where a posture of the user is determined. An indication of the posture is transmitted 1224 to the genre identification module 1226, where a genre of content item is identified, based on the determined posture. The identified genre is transmitted 1228 to the content item recommendation module 1230, where a content item recommendation is identified 1230. The content item recommendation is transmitted 1232 to the output module 1234, where the content item recommendation is generated for display at the content item recommendation module 1236.

FIG. 13 shows a flowchart of illustrative steps involved in generating a content item recommendation based on an identified posture, in accordance with some embodiments of the disclosure. Process 1300 may be implemented on any of the aforementioned computing devices (e.g., smart television 104, 204, 304, 404, 504, 706, 806, 902, tablet device 604). In addition, one or more actions of the process 1300 may be incorporated into or combined with one or more actions of any other process or embodiments described herein.

At 1302, an input associated with a content item delivery service is received, for example, an input for initiating an application associated with a content item delivery service. At 1304, a capture of a user is received via, for example, an image capture device. At 1306, a digital representation of the user is generated. At 1308, it is determined whether there is more than one user in the representation. If it is determined that there is more than one user in the representation, probabilities are assigned to the users at 1310, and a user is identified based on the probabilities at 1312. At 1314, if it is determined that there is only one user in the representation, a posture of that user is determined; if it is determined that there is more than one user in the representation, a posture of the identified user is determined. At 1316, it is determined whether the posture of the user should be monitored over time. If it is determined that the posture of the user should be monitored over time, a time period associated with the posture is identified at 1318. At 1320, it is determined whether the time period exceeds a threshold time period. If the time period does exceed the threshold, then the process proceeds to the next decision point 1322. If the time period does not exceed the threshold, then the process proceeds back to 1314, and the posture of the user is determined. This loop continues until the time period exceeds the threshold time period. If it is determined that the posture does not need to be monitored over time, the process proceeds to the next decision point 1322, where it is determined whether emotional data is required. If emotional data is required, an emotion of the user is identified 1324, and the process proceeds to 1326. If it is determined that emotional data is not required, the process proceeds to 1326, where a content item genre is identified based on the determined posture and, if relevant, the identified emotion of the user. At 1328, a content item recommendation is generated, and at 1330, the content item recommendation is output.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
identifying, at a computing device, a user profile;
receiving an input associated with a content item delivery service;
receiving, from a capture device, a capture of a user;
generating, based on the capture of the user, a digital representation of the user;
determining, based on the digital representation of the user, a posture of the user;
identifying, based on the user profile, that the determined posture of the user is associated with a content item genre;
generating, based on the content item genre, a content item recommendation; and
outputting the generated content item recommendation.

2. The method of claim 1, further comprising determining an emotion of the user, wherein the content item genre is further identified based on the determined emotion.

3. The method of claim 1, further comprising:
determining a time period associated with the determined posture;
identifying whether the time period exceeds a threshold time period; and, if the time period exceeds the threshold time period:
identifying, based on the determined posture of the user and the time period, an updated content item genre;
generating, based on the updated content item genre, an updated content item recommendation; and
outputting the updated content item recommendation.

4. The method of claim 1, further comprising identifying an orientation of the computing device, wherein determining the posture of the user further comprises determining the posture based on the identified orientation of the computing device.

5. The method of claim 1, wherein:
identifying that the determined posture is associated with the content item genre further comprises identifying, based on the determined posture, weightings for a plurality of content item genres; and
generating the content item recommendation further comprises, generating content item recommendations based on the weightings for the plurality of content item genres.

6. The method of claim 1, wherein identifying the content item genre further comprises determining the content item genre via a posture-to-genre mapping table, the method further comprising:
identifying an interaction level associated with the content item recommendation;
determining whether the interaction level is below a threshold value; and, if the interaction level is below the threshold value:
updating the posture-to-genre mapping table to associate a different posture with the content item genre on which the content item recommendation has been generated.

7. The method of claim 1, wherein:
the capture is of a plurality of users;
generating the digital representation of the user further comprises generating a digital representation of at least a subset of the plurality of users; and the method further comprises:
identifying at least a subset of users in the digital representation;
generating a probability value associated with each user of the plurality of users, wherein the probability value indicates a probability of each user interacting with the content item delivery service; and wherein:
the posture is identified for the user having a highest probability value associated with them.

8. The method of claim 7, wherein the at least a subset of users in the digital representation are identified via silhouette-based feature extraction.

9. The method of claim 1, wherein the input is spoken input, and the method further comprises:
identifying the user profile based on the spoken input; and
associating the determined posture with the user profile.

10. The method of claim 1, further comprising:
receiving, at the computing device, a segment of a content item and an associated manifest file;
identifying, via the manifest file, an indication to determine the posture of the user at a playback time of the content item; and wherein:
determining the posture of the user further comprises determining the posture of the user at the indicated playback time.

11. A system comprising:
input circuitry configured to receive an input associated with a content item delivery service; and
processing circuitry configured to:
identify, at a computing device, a user profile;
receive, from a capture device, a capture of a user;
generate, based on the capture of the user, a digital representation of the user;
determine, based on the digital representation of the user, a posture of the user;
identify, based on the user profile, that the determined posture of the user is associated with a content item genre;
generate, based on the content item genre, a content item recommendation; and
output the generated content item recommendation.

12. The system of claim 11, further comprising processing circuitry configured to determine an emotion of the user, and wherein the processing circuitry configured to identify the content item genre is further configured to identify the content item genre based on the determined emotion.

13. The system of claim 11, further comprising processing circuitry configured to:
determine a time period associated with the determined posture;
identify whether the time period exceeds a threshold time period; and, if the time period exceeds the threshold time period:
identify, based on the determined posture of the user and the time period, an updated content item genre;
generate, based on the updated content item genre, an updated content item recommendation; and
output the updated content item recommendation.

14. The system of claim 11, further comprising processing circuitry configured to identify an orientation of the computing device, and wherein the processing circuitry configured to determine the posture of the user is further configured to determine the posture based on the identified orientation of the computing device.

15. The system of claim 11, wherein:
the processing circuitry configured to identify that the determined posture is associated with the content item genre is further configured to identify, based on the determined posture, weightings for a plurality of content item genres; and
the processing circuitry configured to generate the content item recommendation is further configured to generate content item recommendations based on the weightings for the plurality of content item genres.

16. The system of claim 11, wherein the processing circuitry configured to identify the content item genre is further configured to determine a genre via a posture-to-genre mapping table, the system further comprising processing circuitry configured to:
identify an interaction level associated with the content item recommendation;
determine whether the interaction level is below a threshold value; and, if the interaction level is below the threshold value:
update the posture-to-genre mapping table to associate a different posture with the content item genre on which the content item recommendation has been generated.

17. The system of claim 11, wherein:
the capture is of a plurality of users;
the processing circuitry configured to generate the digital representation of the user is further configured to generate a digital representation of at least a subset of the plurality of users; and the processing circuitry is further configured to:
identify at least a subset of users in the digital representation;
generate a probability value associated with each user of the plurality of users, wherein the probability value indicates a probability of each user interacting with the content item delivery service; and wherein:
the processing circuitry configured to identify the posture is further configured to identify the posture for the user having a highest probability value associated with them.

18. The system of claim 17, wherein the processing circuitry configured to identify the at least a subset of users in the digital representation is further configured to identify the at least a subset of users via silhouette-based feature extraction.

19. The system of claim 11, wherein the input circuitry is further configured to receive spoken input, and the processing circuitry is further configured to:
identify the user profile based on the spoken input; and
associate the determined posture with the user profile.

20. The system of claim 11, further comprising processing circuitry configured to:
receive, at the computing device, a segment of a content item and an associated manifest file;
identify, via the manifest file, an indication to determine the posture of the user at a playback time of the content item; and wherein:
the processing circuitry configured to determine the posture of the user is further configured to determine the posture of the user at the indicated playback time.

* * * * *